(12) United States Patent
Wen et al.

(10) Patent No.: US 11,347,898 B2
(45) Date of Patent: May 31, 2022

(54) DATA PROTECTION DEVICE AND METHOD AND STORAGE CONTROLLER

(71) Applicant: Gree Electric Appliances, Inc. of Zhuhai, Guangdong (CN)

(72) Inventors: Langming Wen, Guangdong (CN); Hao Liu, Guangdong (CN); Heng Chen, Guangdong (CN); Haoliang Zhang, Guangdong (CN); Li Fang, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 310 days.

(21) Appl. No.: 16/485,679

(22) PCT Filed: Oct. 13, 2017

(86) PCT No.: PCT/CN2017/106140
§ 371 (c)(1),
(2) Date: Aug. 13, 2019

(87) PCT Pub. No.: WO2018/145483
PCT Pub. Date: Aug. 16, 2018

(65) Prior Publication Data
US 2019/0384939 A1    Dec. 19, 2019

(30) Foreign Application Priority Data
Feb. 13, 2017  (CN) .......................... 201710077709.5

(51) Int. Cl.
*G06F 21/60*    (2013.01)
*G06F 21/79*    (2013.01)
(Continued)

(52) U.S. Cl.
CPC ............ *G06F 21/79* (2013.01); *G06F 21/602* (2013.01); *H04L 9/0625* (2013.01);
(Continued)

(58) Field of Classification Search
CPC .......... G06F 21/78; G06F 21/79; G06F 21/60; G06F 21/602; G06F 21/62; G06F 21/70;
(Continued)

(56) References Cited

U.S. PATENT DOCUMENTS 9,483,664 B2 * 11/2016 Chandra ................. G06F 21/79
2007/0136607 A1 * 6/2007 Launchbury ........ G06F 12/1408
713/190

(Continued)

FOREIGN PATENT DOCUMENTS

CN       1565102 A     1/2005
CN     104346103 A     2/2015
(Continued)

OTHER PUBLICATIONS

International Search Report, dated Jan. 11, 2018, in International application No. PCT/CN2017/106140, filed on Oct. 13, 2017.

*Primary Examiner* — Shaqueal D Wade-Wright
(74) *Attorney, Agent, or Firm* — McAndrews, Held & Malloy, Ltd.

(57) ABSTRACT

A device and method for data protection, and a storage controller, related to the technical field of data protection. The device comprises: an encryption unit (11), used for receiving first data to be written into a storage module and first storage address information (401), and for encrypting the first data on the basis of the first storage address information and of feature information of the storage module (402); and a decryption unit (12), used for reading from the storage module second data corresponding to second storage address information (403), and for decrypting the second data on the basis of the second storage address information and of the feature information (404).

15 Claims, 4 Drawing Sheets

(51) Int. Cl.
*H04L 9/06* (2006.01)
*H04L 9/08* (2006.01)

(52) U.S. Cl.
CPC .......... *H04L 9/0631* (2013.01); *H04L 9/0866* (2013.01); *H04L 9/0869* (2013.01)

(58) Field of Classification Search
CPC ....... G06F 21/72; G06F 12/14; H04L 9/0625; H04L 9/0631; H04L 9/06; H04L 9/08; H04L 9/0866; H04L 9/0869
See application file for complete search history.

(56) References Cited

U.S. PATENT DOCUMENTS

| | | | |
|---|---|---|---|
| 2013/0205139 A1* | 8/2013 | Walrath | G06F 21/72 713/190 |
| 2014/0040639 A1* | 2/2014 | Raam | G11C 16/22 713/193 |
| 2015/0052370 A1* | 2/2015 | Hars | G06F 21/78 713/193 |
| 2016/0078252 A1 | 3/2016 | Chandra et al. | |
| 2021/0073404 A1* | 3/2021 | Sakata | G06F 3/0656 |

FOREIGN PATENT DOCUMENTS

| | | |
|---|---|---|
| CN | 105426786 A | 3/2016 |
| CN | 106599735 A | 4/2017 |

\* cited by examiner

DATA PROTECTION DEVICE AND METHOD AND STORAGE CONTROLLER This application is a 371 of International Patent Application No. PCT/CN2017/106140, filed Oct. 13, 2017, which claims benefit of Chinese Patent Application No. 201710077709.5, filed to the China Patent Office on Feb. 13, 2017, entitled "Device and Method for Data Protection, and Storage Controller," contents of both of which are hereby incorporated by reference in their entirety.

TECHNICAL FIELD

The present disclosure relates to the technical field of data protection, and in particular to a data protection device and method and a storage controller.

BACKGROUND

At present, along with development of electronic technologies, embedded systems have been applied extensively to electronic products. A flash memory, as a non-volatile memory bank, may also permanently hold data without a current supply. Flashes are divided into a Not OR (NOR) type and a Not AND (NAND) type. For example, a NOR flash, as a storage device, is configured to store system software and important application data, and has been applied extensively to Microcontroller Elements (MCUs) and large-size Systems on Chip (SOCs). For application to an MCU, the NOR flash may be integrated into the whole MCU chip. For application to an SOC, the NOR flash is usually mounted outside an SOC as a peripheral. System startup software, related application software and the like are stored in the NOR flash, and after power-on, a system is started up from a space of the NOR flash.

The NOR flash may be cracked in many manners. For example, for a NOR flash embedded into an MCU, a logic array in the NOR flash is analyzed with a tool to restore data stored in the NOR flash. For a flash mounted outside an SOC, a program and data running in a system may be analyzed directly by measuring at least one interface signal. At present, data stored in the NOR flash is relatively easy to be decoded and analyzed and a cracker may acquire important user data, which threatens information security of a user. Therefore, it is necessary to protect system software and data stored in the NOR flash to meet a security requirement.

SUMMARY

At least some embodiments of the present disclosure provide a data protection device and method and a storage controller, which may perform encryption and decryption processing on write data and read data according to a storage address and characteristic information of a storage component.

In an embodiment of the present disclosure, a data protection device is provided, which includes: an encryption element, connected with a storage component and configured to receive first data to be written into the storage component and first storage address information and perform encryption processing on the first data according to the first storage address information and characteristic information of the storage component, the first data, after being subjected to encryption processing, being written into the storage component; and a decryption element, connected with the storage component and configured to read second data corresponding to second storage address information from the storage component and perform decryption processing on the second data according to the second storage address information and the characteristic information.

In an optional embodiment, the encryption element includes: an address encryption component, configured to encrypt the first storage address information according to an address encryption key and a first encryption algorithm to obtain first encrypted address information; a first conversion component, connected with the address encryption component and configured to execute a conversion operation on the first data and the first encrypted address information to obtain a conversion result; and a data encryption component, connected with the first conversion component and the storage component respectively and configured to perform encryption processing on the conversion result according to a data encryption and decryption key and a second encryption algorithm to obtain encrypted data, the encrypted data being written into the storage component.

In an optional embodiment, the decryption element includes: a data decryption component, connected with the storage component and configured to perform decryption processing on the second data according to the data encryption and decryption key and the second encryption algorithm to obtain decrypted data; and a second conversion component, connected with the data decryption component and configured to execute an inverse conversion operation on the decrypted data and second encrypted address information to obtain original data corresponding to the second data, and the address encryption component is connected with the second conversion component, and is further configured to receive the second storage address information and encrypt the second storage address information according to the address encryption key and the first encryption algorithm to obtain the second encrypted address information.

In an optional embodiment, the first encryption algorithm includes an Advanced Encryption Standard (AES) algorithm and a Data Encryption Standard (DES) algorithm; the second encryption algorithm includes the AES algorithm and the DES algorithm; and the conversion operation includes an exclusive OR operation.

In an optional embodiment, protection device further includes: a key generation component, connected with the address encryption component, the data encryption component and the data decryption component respectively and configured to generate the address encryption key and the data encryption and decryption key according to the characteristic information.

In an optional embodiment, the characteristic information includes a storage component Identifier (ID) and at least one random sequence stored in the storage component.

In an optional embodiment, the encryption element is further configured to determine whether all bits of the first data are 1 or not, when all bits of the first data are 1, write the first data into the storage component and, when not all bits of the first data are 1, write the encrypted data into the storage component; and the decryption element is further configured to determine whether all bits of the second data are 1 or not, when all bits of the second data are 1, output the second data and, when not all bits of the second data are 1, output the original data corresponding to the second data, all bits in an erased storage region of the storage component being 1 after an erasing operation.

In an optional embodiment, the encryption element includes a first selector component; a first input end of the first selector component is connected with the data encryption component, and a second input end of the first selector component receives the first data; an output end of the first selector component is connected with the storage component; and when all the bits of the first data are 1, the output end of the first selector component outputs the first data, and when not all the bits of the first data are 1, the output end of the first selector component outputs the encrypted data.

In an optional embodiment, the decryption element includes a second selector component; a first input end of the second selector component is connected with the second conversion component, and a second input end of the second selector component is connected with the storage component; and when all the bits of the second data are 1, an output end of the second selector component outputs the second data, and when not all the bits of the second data are 1, the output end of the second selector component outputs the original data corresponding to the second data.

In an optional embodiment, the storage component includes a Not OR (NOR) flash storage component.

In another embodiment of the present disclosure, a storage controller is provided, which includes the abovementioned data protection device.

In another embodiment of the present disclosure, a data protection method is provided, which includes that:

receiving first data to be written into a storage component and first storage address information; performing encryption processing on the first data according to the first storage address information and characteristic information of the storage component, the first data, after being subjected to encryption processing, being written into the storage component; reading second data corresponding to second storage address information from the storage component; and performing decryption processing on the second data according to the second storage address information and the characteristic information.

In an optional embodiment, performing encryption processing on the first data according to the first storage address information and the characteristic information of the storage component includes: encrypting the first storage address information according to an address encryption key and a first encryption algorithm to obtain first encrypted address information; executing a conversion operation on the first data and the encrypted address information to obtain a conversion result; and performing encryption processing on the conversion result according to a data encryption and decryption key and a second encryption algorithm to obtain encrypted data, the encrypted data being written into the storage component.

In an optional embodiment, performing decryption processing on the second data according to the second storage address information and the characteristic information includes: performing decryption processing on the second data according to the data encryption and decryption key and the second encryption algorithm to obtain decrypted data; and executing an inverse conversion operation on the decrypted data and second encrypted address information to obtain original data corresponding to the second data, the second storage address information being encrypted according to the address encryption key and the first encryption algorithm to obtain the second encrypted address information.

In an optional embodiment, the first encryption algorithm includes an Advanced Encryption Standard (AES) algorithm and a Data Encryption Standard (DES) algorithm; the second encryption algorithm includes the AES algorithm and the DES algorithm; and the conversion operation includes an exclusive OR operation.

In an optional embodiment, generating the address encryption key and the data encryption and decryption key according to the characteristic information, and the characteristic information includes a storage component Identifier (ID) and at least one random sequence stored in the storage component.

In an optional embodiment, further including at least one of the followings: determining whether all bits of the first data are 1 or not, when all bits of the first data are 1, writing the first data into the storage component and, when not all bits of the first data are 1, writing the encrypted data into the storage component; and, determining whether all bits of the second data are 1 or not, when all bits of the second data are 1, outputting the second data and, when not all bits of the second data are 1, outputting the original data corresponding to the second data, and all bits in an erased storage region of the storage component are 1 after an erasing operation.

According to the data protection device and method and storage controller of the present disclosure, encryption and decryption processing is performed on write data and read data according to a storage address and the characteristic information of the storage component, so that security of the data in the storage component can be improved; and after the erasing operation is executed on the storage component, the read data contains no decryption component information, so that difficulties in cracking may effectively be ensured, and contents may be protected.

BRIEF DESCRIPTION OF THE DORIGINALINGS

In order to describe the technical solutions in embodiments of the present disclosure or a related art more clearly, the doriginalings required to be used for describing the embodiments or the related art will be simply introduced below. It is apparent that the doriginalings described below are some embodiments of the present disclosure. Those of ordinary skill in the art may further obtain other doriginalings according to these doriginalings without creative work.

DETAILED DESCRIPTION

The present disclosure will be described below more comprehensively with reference to the doriginalings and exemplary embodiments of the present disclosure are illustrated. The technical solutions in the embodiments of the present disclosure will be described clearly and completely below in combination with the doriginalings in the embodiments of the present disclosure. It is apparent that the described embodiments are not all the embodiments but only part of embodiments of the present disclosure. All other embodiments obtained by those of ordinary skill in the art according to the embodiments in the present disclosure without creative work shall fall within the scope of protection of the present disclosure. The technical solutions of the present disclosure will be described from many aspects below in combination with each doriginaling and embodiment.

"First", "second" and the like used hereinafter are adopted for discriminative description and do not have other special meanings.

Figure 1:
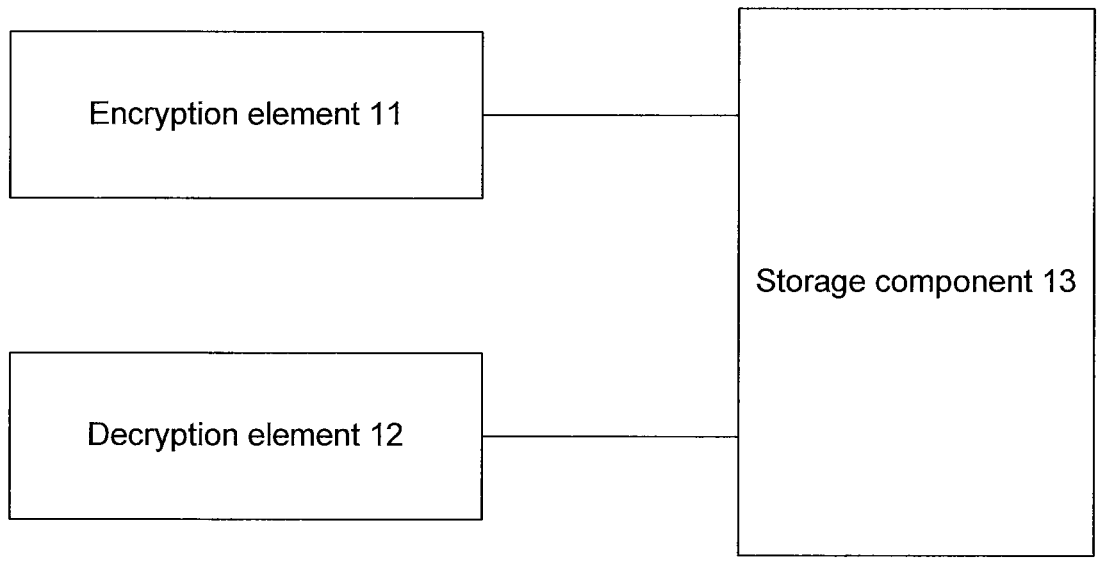
FIG. 1 is a component schematic diagram of a data protection device according to an embodiment of the present disclosure.

As shown in FIG. 1, a data protection device of the present disclosure includes an encryption element 11 and a decryption element 12. The encryption element 11 is connected with a storage component 13. The encryption element 11 receives first data to be written into the storage component 13 and first storage address information. The encryption element 11 performs encryption processing on the first data according to the first storage address information and characteristic information of the storage component. The first data, after being subjected to encryption processing, is written into the storage component 13. The storage component 13 may be of various types. For example, the storage component 13 may be a NOR flash storage component.

The decryption element 12 is connected with the storage component 13, and reads second data corresponding to second storage address information from the storage component 13. The second data is data subjected to encryption processing. The decryption element 12 performs decryption processing on the second data according to the second storage address information and the characteristic information. Decrypted data is original data corresponding to the second data. For the same storage address, write data and read data are the same.

According to the data protection device in the embodiment, encryption and decryption processing is performed on write data and read data according to a storage address and the characteristic information of the storage component, so that security of the data in the storage component can be improved.

Figure 2:
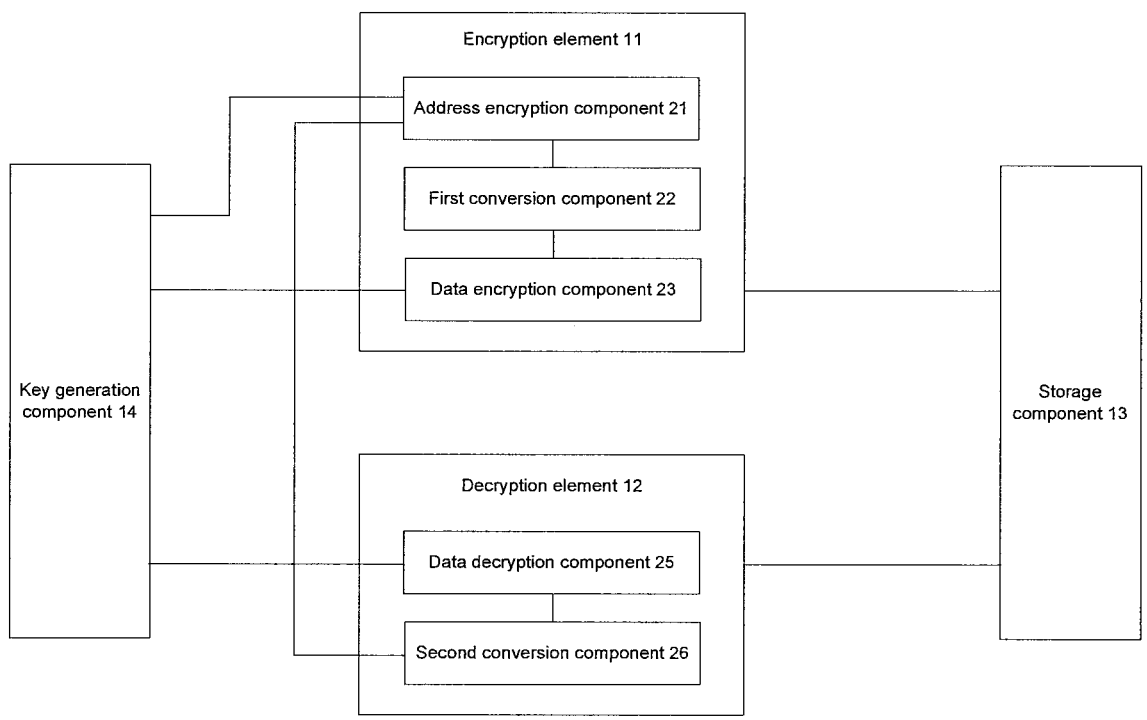
FIG. 2 is a component schematic diagram of a data protection device according to another embodiment of the present disclosure.

As shown in FIG. 2, the encryption element 11 includes an address encryption component 21, a first conversion component 22 and a data encryption component 23. The address encryption component 21 encrypts the first storage address information according to an address encryption key and a first encryption algorithm to obtain first encrypted address information. The address encryption component 21 may store multiple encryption algorithms and select an encryption algorithm according to a requirement on a reading or writing speed. The first encryption algorithm may be a custom algorithm or a standard algorithm such as an AES algorithm, a DES algorithm and a national cryptographic algorithm (approved by the State Cryptography Administration).

The first conversion component 22 is connected with the address encryption component 21, and executes a conversion operation on the first data and the first encrypted address information to obtain a conversion result. The conversion operation may be a bit operation such as an exclusive OR operation, an AND operation and an OR operation. For example, the first conversion component 22 executes the exclusive OR operation on the first data and the encrypted first storage address information to introduce an address as an influencing factor for data encryption. The conversion operation may also be recombination, for example, simple piecing, of the encrypted address information and the first data according to a certain principle.

The data encryption component 23 is connected with the first conversion component 22 and the storage component 13. The data encryption component 23 performs encryption processing on the conversion result generated by the first conversion component 22 according to a data encryption and decryption key and a second encryption algorithm to obtain encrypted data. The encrypted data is written into the storage component 13.

The data encryption component 23 encrypts data to be burnt into the storage component 13 by use of the data encryption and decryption key. The data encryption component 23 may select a common encryption algorithm or a custom algorithm, and may also adopt some permutation manners. The encryption algorithm selected by the data encryption component 23 is a symmetric algorithm, so that data decryption may be conveniently implemented according to the same encryption algorithm when the data in the storage component 13 is read.

The data encryption component 23 may store multiple encryption algorithms, and may select an encryption algorithm according to a requirement on a reading or writing speed. The second encryption algorithm may be a custom algorithm or a standard algorithm such as an AES algorithm, a DES algorithm and a national cryptographic algorithm (approved by the State Cryptography Administration). For example, if write and read operations over a flash are to be completed within a system clock cycle, the encryption algorithm selected by the data encryption component 23 is to complete encryption and decryption operations over the address within the system clock cycle.

The decryption element 12 includes a data decryption component 25 and a second conversion component 26. The data decryption component 25 is connected with the storage component, and performs decryption processing on the second data acquired from the storage component 13 according to the data encryption and decryption key and the second encryption algorithm to obtain decrypted data. The data decryption component 25 reads the data from the storage component 13 for decryption by use of the data encryption and decryption key. And an algorithm adopted by the data decryption component 25 for a decryption operation or an inverse operation is kept consistent with the second encryption algorithm adopted by the data encryption component 23.

The second conversion component 26 is connected with the data decryption component 25, and executes an inverse conversion operation on the decrypted data and second encrypted address information to obtain the original data corresponding to the second data, i.e., clear data that is not encrypted. The inverse conversion operation adopted by the second conversion component 26 corresponds to the conversion operation adopted by the first conversion component 22, and may be an exclusive OR operation, an AND operation, an OR operation and the like.

The address encryption component 21 is connected with the second conversion component 26. The address encryption component 21 receives the second storage address information and encrypts the second storage address information according to the address encryption key and the first encryption algorithm to obtain the second encrypted address information. An independent component configured to generate the second encrypted address information may also be set to obtain the second encrypted address information by the same method.

For example, when the read operation is executed on the data in the storage component 13, the data corresponding to a corresponding address is read from the storage component 13, and the data is encrypted. The data decryption component 25 decrypts the read data according to the data encryption and decryption key, and the second conversion component 26 executes an exclusive OR operation on a result output by the data decryption component 25 and the encrypted address to restore the clear data.

A key generation component 14 is connected with the address encryption component 21, the data encryption component 23 and the data decryption component 25 respectively. The key generation component 14 generates the address encryption key and the data encryption and decryption key according to the characteristic information. The characteristic information includes a storage component ID, at least one random sequence stored in the storage component and the like.

For improving flexibility and complexity of an encryption and decryption function, the key generation component 14 may ensure that keys generated by each storage component during running are different. The storage component ID is a unique ID representing each storage component, is a series of labels represented in a numerical form, and may be 32-bit, 64-bit or 128-bit. The at least one random sequence may be stored in each storage component as a source seed, is a random number and is set for each storage component during production. The storage component ID and the at least one random sequence may be stored in a Non-Volatile Memory (NVM).

The storage component ID and the random sequence are taken as input of the key generation component 14. The key generation component 14 generates two groups of keys through an operation by use of an internal algorithm. One group is the address encryption key and the other group is the data encryption and decryption key. For example, the key generation component 14 executes an encryption operation on the 128-bit storage component ID according to the AES algorithm to obtain a 128-bit operation result. The higher 64 bits of the operation result may be taken as one group of key, and the lower 64 bits of the operation result may be taken as the other group of key.

All bits in an erased storage region of the storage component 13 are 1 after an erasing operation. The encryption element 11 determines whether all bits of the first data are 1 or not. When all bits of the first data are 1, the encryption element 11 writes the first data into the storage component 13. And, when not all bits of the first data are 1, the encryption element 11 writes the encrypted data output by the data encryption component 23 into the storage component 13. The decryption element 12 determines whether all bits of the second data are 1 or not. When all bits of the second data are 1, the decryption element 12 outputs the second data. And when not all bits of the second data are 1, the decryption element 12 outputs the original data corresponding to the second data.

For example, an erasing operation over a NOR flash is executed by taking block as a unit, and after executing the erasing operation on the NOR flash, all bits in an erased storage region are 1, namely a value of each byte is 0xFF. When the data in the erased storage region is read, all read bits are also to be 1 based on protection over an encryption and decryption algorithm, so that a storage address of the storage component can be effectively and correctly managed.

When all the bits of the write data are 1, the data is directly written into the NOR flash without encryption processing performed by the data encryption component 23 and the like. In a data reading process, when all the bits of the data acquired from the NOR flash are 1, the data is directly output without decryption processing performed by the data decryption component 25 and the like, and no decryption component information is contained, so that difficulties in cracking are effectively ensured, and contents are protected.

Figure 3A:
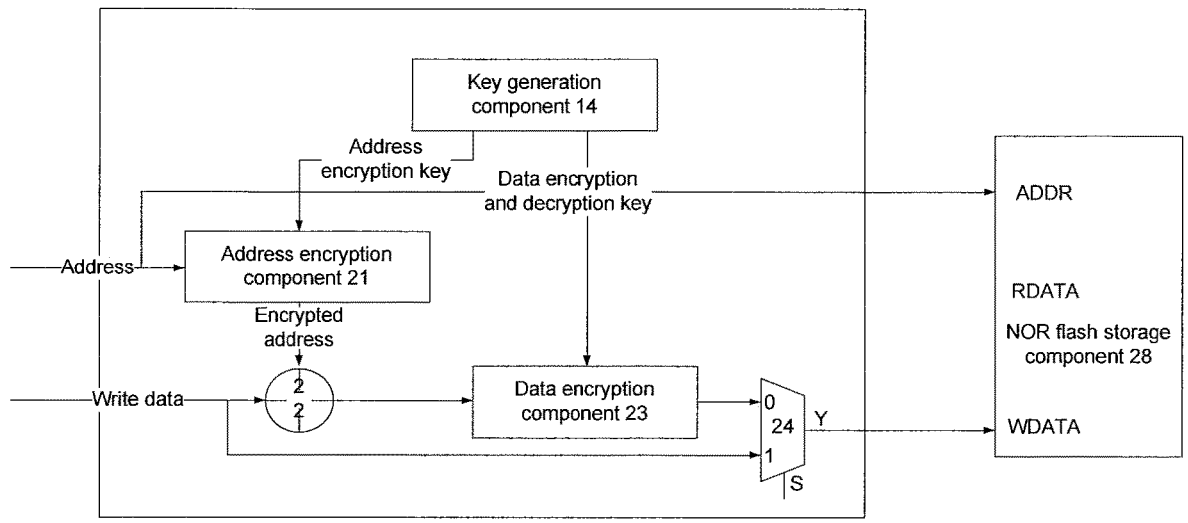
FIG. 3A is a schematic diagram of a logic circuit for write data of a data protection device according to another embodiment of the present disclosure.
Figure 3B:
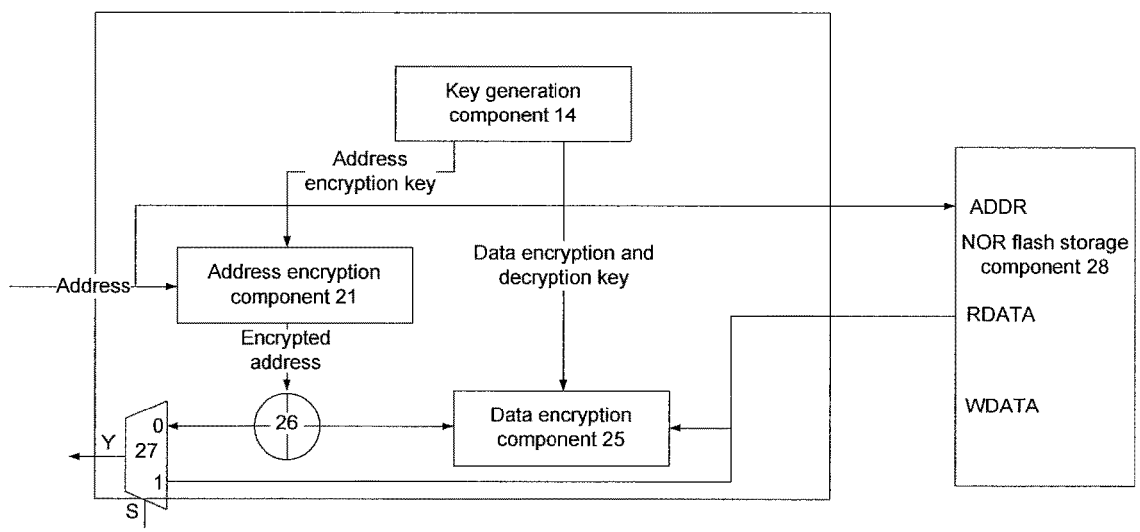
FIG. 3B is a schematic diagram of a logic circuit for read data of a data protection device according to another embodiment the present disclosure.

In an optional embodiment, as shown in FIGS. 3A and 3B, the storage component ID and at least one random sequence stored in the NVM inside or outside the data protection device are read and input into the key generation component 14. The key generation component 14 executes an operation according to at least one of the storage component ID and the at least one random sequence, thereby generating the address encryption key and the data encryption and decryption key. The storage component is a NOR flash storage component 28. The operation that the key generation component 15 generates the address encryption key and the data encryption and decryption key is to be completed before the read and write operations are executed on the NOR flash storage component 28.

When the write operation is to be executed on the NOR flash storage component 28, the address encryption component 21 receives the input first storage address information, and the address encryption component 21 encrypts the first storage address information according to the address encryption key generated by the key generation component 14 to obtain the first encrypted address information. The encrypted address information and the input write data are input into the first conversion component 22, the first conversion component 22 executes an exclusive OR operation on the first encrypted address information and the write data, and the operation result is taken as input of the data encryption component 23. The data encryption component 23 executes the encryption operation on the write data subjected to the exclusive OR operation according to the data encryption and decryption key to obtain finally encrypted write data.

When the read operation is executed on the NOR flash storage component 28, the second storage address information is input to an ADDR port (address port) of the NOR flash storage component 28, and read data corresponding to the second storage address information is read from a RDATA port (read port) of the NOR flash storage component 28. The read data is encrypted. The data decryption component 25 decrypts the read data according to the data encryption and decryption key.

The address encryption component 21 encrypts the second storage address information according to the address encryption key generated by the key generation component 14 to obtain the second encrypted address information. The second conversion component 26 executes an exclusive OR operation on the decrypted read data output by the data decryption component 25 and the second encrypted address information to recover the clear data.

The encryption element 11 includes a first selector component 24. A first input end of the first selector component 24 is connected with the data encryption component 23, and a second input end of the first selector component 24 receives the write data, i.e., original write data. An output end of the first selector component 24 is connected with the NOR flash storage component 28.

A strobe end of the first selector component 24 is an S end, and the output end of the first selector component 24 is a Y end. A strobe signal is sent to the S end to control output of the Y end according to a determination result of whether all the bits of the write data are 1 or not. When all the bits of the write data are 1, the output end of the first selector component 24 outputs the original write data, and when not all the bits of the first data are 1, the output end of the first selector component 24 outputs the write data encrypted by the data encryption component 23.

The first storage address information is sent to the ADDR port of the NOR flash storage component 28. The Y end of the first selector component 24 is connected with a WDATA port (write port) of the NOR flash storage component 28, and the data output by the Y end of the first selector component 24 is written into the NOR flash storage component 28.

The decryption element 12 includes a second selector component 27. A first input end of the second selector component 27 is connected with the second conversion component 26, and a second input end of the second selector component 27 is connected with the NOR flash storage component 28. A strobe end of the second selector component 27 is an S end, and an output end of the second selector component 27 is a Y end. A strobe signal is sent to the S end to control output of the Y end according to a determination result of whether all the bits of the second data are 1 or not.

When all the bits of the read data read from the NOR flash storage component 28 are 1, the output end of the second selector component 27 outputs the read data read from the NOR flash storage component 28. When not all the bits of the read data read from the NOR flash storage component 28 is 1, the output end of the second selector component outputs the original data, output by the second conversion component 26, corresponding to the read data.

In another embodiment of the present disclosure, a storage controller is also provided, which includes the data protection device in any abovementioned embodiment. The storage controller may be a flash storage controller and the like.

According to the data protection device and storage controller in the abovementioned embodiments, encryption and decryption processing is performed on the write data and the read data according to the storage address and the characteristic information of the storage component, so that the security of the data in the storage component can be improved, and the storage address of the storage component can be effectively and correctly managed. After the erasing operation is executed on the storage component, the read data contains no decryption component information, so that difficulties in cracking can effectively be ensured, and the contents can be protected.

Figure 4:
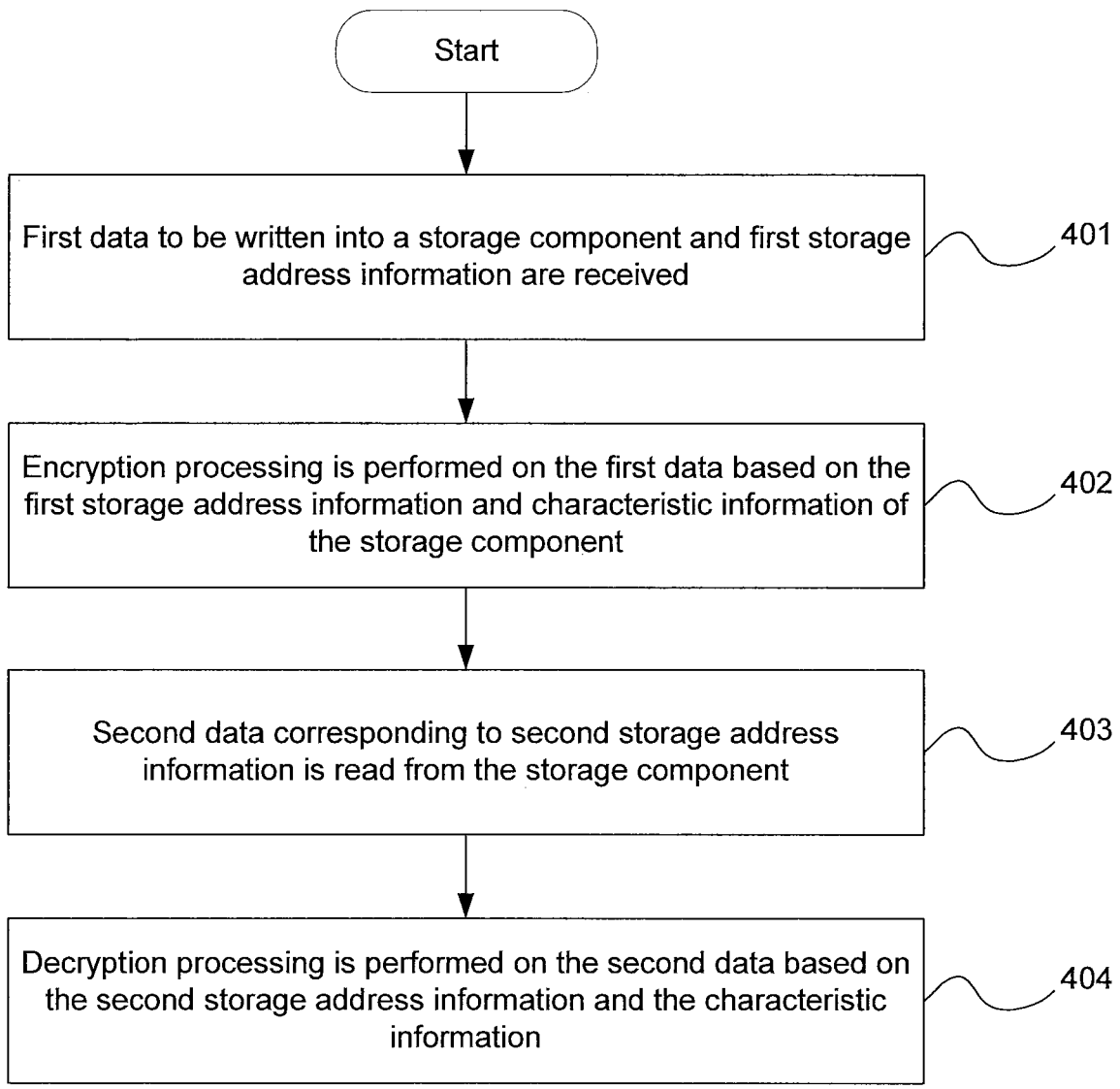
FIG. 4 is a flowchart of a data protection method according to an embodiment of the present disclosure.

FIG. 4 is a flowchart of a data protection method according to an embodiment of the present disclosure. As shown in FIG. 4, the method includes the following steps.

At step 401, first data to be written into a storage component and first storage address information are received.

At step 402, encryption processing is performed on the first data according to the first storage address information and characteristic information of the storage component, the first data, after being subjected to encryption processing, being written into the storage component.

At step 403, second data corresponding to second storage address information is read from the storage component.

At step 404, decryption processing is performed on the second data according to the second storage address information and the characteristic information.

According to the data protection method in the embodiment, encryption and decryption processing is performed on write data and read data according to a storage address and the characteristic information of the storage component, so that security of the data in the storage component can be improved.

Figure 5:
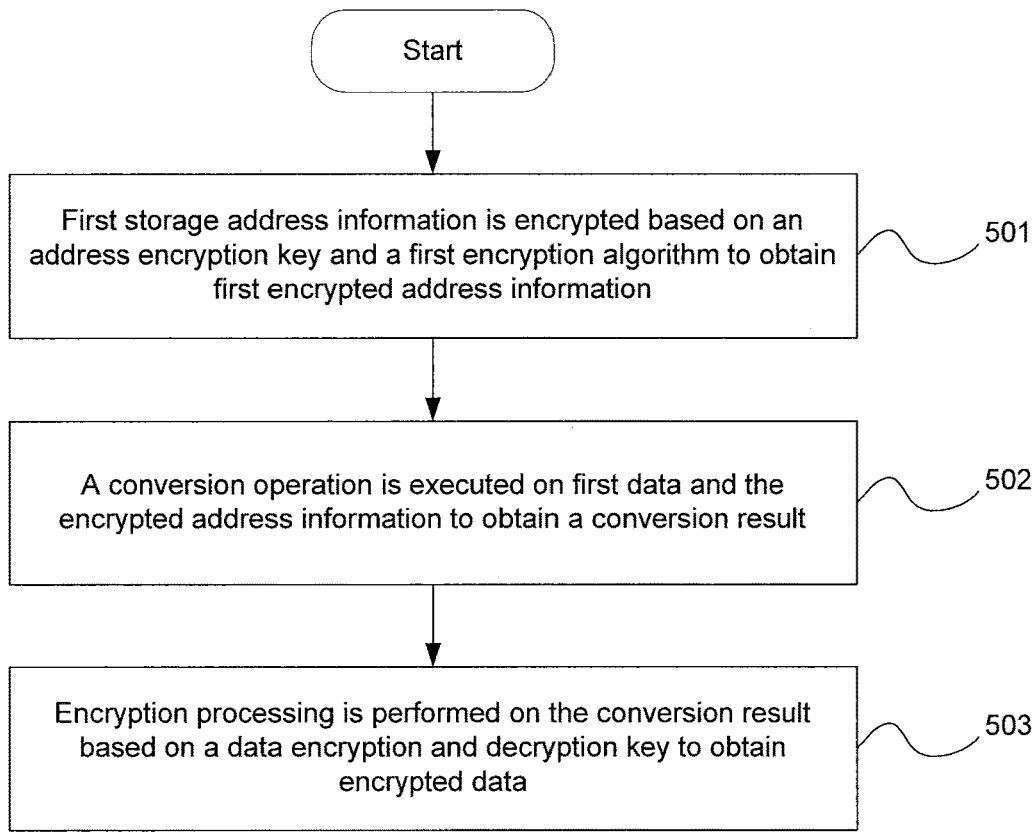
FIG. 5 is a flowchart of processing write data in a data protection method according to an embodiment of the present disclosure.

FIG. 5 is a flowchart of processing write data in a data protection method according to an embodiment of the present disclosure. As shown in FIG. 5, the processing includes the following steps.

At step 501, the first storage address information is encrypted according to an address encryption key and a first encryption algorithm to obtain first encrypted address information.

At step 502, a conversion operation is executed on the first data and the encrypted address information to obtain a conversion result.

At step 503, encryption processing is performed on the conversion result according to a data encryption and decryption key and a second encryption algorithm to obtain encrypted data, the encrypted data being written into the storage component.

The address encryption key and the data encryption and decryption key are generated according to the characteristic information, and the characteristic information includes a storage component ID, a random sequence stored in the storage component and the like.

Figure 6:
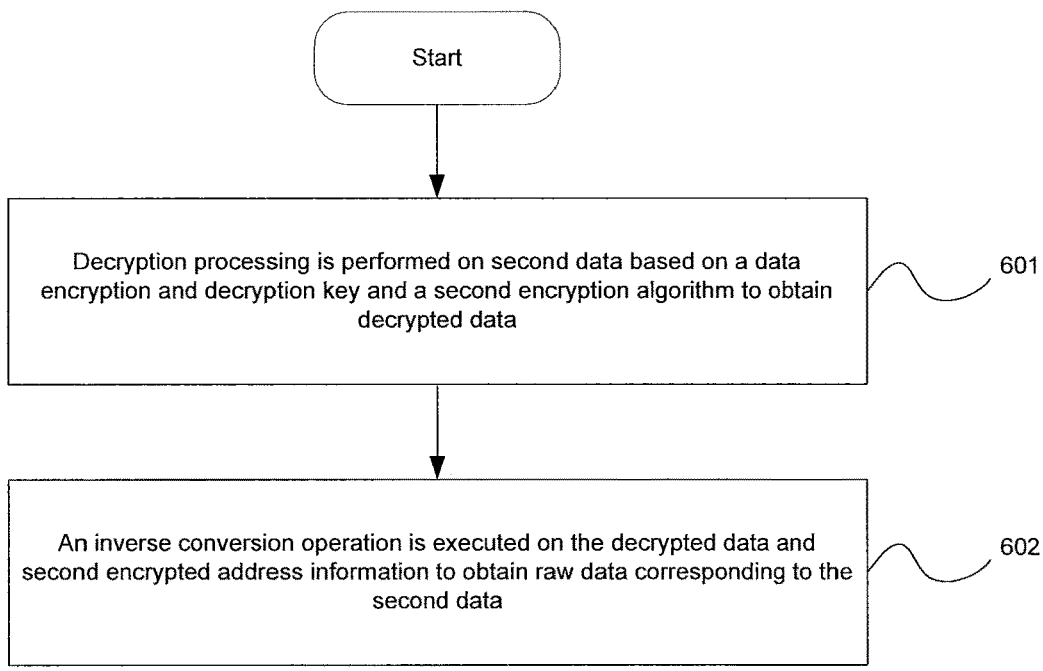
FIG. 6 is a flowchart of processing read data in a data protection method according to an embodiment of the present disclosure.

FIG. 6 is a flowchart of processing read data in a data protection method according to an embodiment of the present disclosure. As shown in FIG. 6, the processing includes the following steps.

At step 601, decryption processing is performed on the second data according to the data encryption and decryption key and the second encryption algorithm to obtain decrypted data.

At step 602, an inverse conversion operation is executed on the decrypted data and second encrypted address information to obtain original data corresponding to the second data, the second storage address information being encrypted according to the address encryption key and the first encryption algorithm to obtain the second encrypted address information.

The first encryption algorithm includes an AES algorithm and a DES algorithm. The second encryption algorithm includes the AES algorithm and the DES algorithm. And the conversion operation includes an exclusive OR operation.

All bits in an erased storage region of the storage component are 1 after an erasing operation. Whether all bits of the first data are 1 or not is determined. When all bits of the first data are 1, the first data is written into the storage component. And when not all bits of the first data are 1, the encrypted data is written into the storage component. Whether all bits of the second data are 1 or not is determined. When all bits of the second data are 1, the second data is output. And when not all bits of the second data are 1, the original data corresponding to the second data is output.

According to the data protection device and method and storage controller in the abovementioned embodiments, encryption and decryption processing is performed on write data and read data according to a storage address and the characteristic information of the storage component, so that security of the data in the storage component can be improved, and the storage address of the storage component can be effectively and correctly managed; after the erasing operation is executed on the storage component, the read data contains no decryption component information, so that difficulties in cracking can effectively be ensured, and contents can be protected; and moreover, a logic structure is simple and occupies few resources, and high circuit reliability and wide application range are ensured.

The method and system of the present disclosure may be implemented in many manners. For example, the method and system of the present disclosure may be implemented by software, hardware, firmware or any combination of the software, the hardware and the firmware. The sequence of the steps of the method is for description, and the steps of the method of the present disclosure are not limited to the sequence specifically described above, unless particularly described in other manners. In addition, in some embodiments, the present disclosure may also be implemented into programs stored in a recording medium, and these programs include machine-readable instructions configured to implement the method according to the present disclosure. Therefore, the present disclosure also covers the recording medium storing the programs configured to execute the method according to the present disclosure.

The description about the present disclosure is made for exemplary description but is not exhaustive or intended to limit the present disclosure the disclosed form. Many modifications and variations are apparent to those of ordinary skill in the art. The embodiments are selected and described to describe the principle and practical application of the present disclosure and enable those of ordinary skill in the art to understand the present disclosure and thus design various embodiments suitable for specific purposes and containing various modifications.

What is claimed is:

1. A data protection device, comprising: a hardware processor coupled with a memory and configured to execute program elements stored on the memory, wherein the program elements comprise:
    an encryption element, configured to receive first data to be written into the memory and first storage address information and perform encryption processing on the first data according to the first storage address information and characteristic information of the memory, the first data, after being subjected to encryption processing, being written into the memory; and
    a decryption element, connected with the storage component and configured to read second data corresponding to second storage address information from the memory and perform decryption processing on the second data according to the second storage address information and the characteristic information;
    wherein the encryption element is further configured to determine whether all bits of the first data are 1 or not, when all bits of the first data are 1, write the first data into the memory and, when not all bits of the first data are 1, write encrypted data into the memory; and
    the decryption element is further configured to determine whether all bits of the second data are 1 or not, when all bits of the second data are 1, output the second data and, when not all bits of the second data are 1, output original data corresponding to the second data,
    all bits in an erased storage region of the memory being 1 after an erasing operation.

2. The protection device as claimed in claim 1, wherein the encryption element comprises:
    an address encryption component, configured to encrypt the first storage address information according to an address encryption key and a first encryption algorithm to obtain first encrypted address information;
    a first conversion component, connected with the address encryption component and configured to execute a conversion operation on the first data and the first encrypted address information to obtain a conversion result; and
    a data encryption component, connected with the first conversion component and the memory respectively and configured to perform encryption processing on the conversion result according to a data encryption and decryption key and a second encryption algorithm to obtain the encrypted data, the encrypted data being written into the memory.

3. The protection device as claimed in claim 2, wherein the decryption element comprises:
    a data decryption component, connected with the memory and configured to perform decryption processing on the second data according to the data encryption and decryption key and the second encryption algorithm to obtain decrypted data; and
    a second conversion component, connected with the data decryption component and configured to execute an inverse conversion operation on the decrypted data and second encrypted address information to obtain the original data corresponding to the second data,
    wherein the address encryption component is connected with the second conversion component, and is further configured to receive the second storage address information and encrypt the second storage address information according to the address encryption key and the first encryption algorithm to obtain the second encrypted address information.

4. The protection device as claimed in claim 3, wherein
    the first encryption algorithm comprises an Advanced Encryption Standard (AES) algorithm and a Data Encryption Standard (DES) algorithm;
    the second encryption algorithm comprises the AES algorithm and the DES algorithm; and
    the conversion operation comprises an exclusive OR operation.

5. The protection device as claimed in claim 3, further comprising:
    a key generation component, connected with the address encryption component, the data encryption component and the data decryption component respectively and configured to generate the address encryption key and the data encryption and decryption key according to the characteristic information.

6. The protection device as claimed in claim 5, wherein the characteristic information comprises a memory Identifier (ID) and at least one random sequence stored in the memory.

7. The protection device as claimed in claim wherein
    the encryption element comprises a first selector component; a first input end of the first selector component is connected with the data encryption component, and a second input end of the first selector component receives the first data; an output end of the first selector component is connected with the memory; and when all the bits of the first data are 1, the output end of the first selector component outputs the first data, and when not all the bits of the first data are 1, the output end of the first selector component outputs the encrypted data.

8. The protection device as claimed in claim 1, wherein the decryption element comprises a second selector component; a first input end of the second selector component is connected with the second conversion component, and a second input end of the second selector component is connected with the memory; and when all the bits of the second data are 1, an output end of the second selector component outputs the second data, and when not all the bits of the second data are 1, the output end of the second selector component outputs the original data corresponding to the second data.

9. The protection device as claimed in claim 1, wherein the memory comprises a Not OR (NOR) flash memory.

10. A storage controller, comprising:
the data protection device as claimed in any one of claims claim 1.

11. A data protection method, comprising:
receiving first data to be written into a memory and first storage address information;
performing encryption processing on the first data according to the first storage address information and characteristic information of the memory, the first data, after being subjected to encryption processing, being written into the memory;
reading second data corresponding to second storage address information from the storage component; and
performing decryption processing on the second data according to the second storage address information and the characteristic information,
wherein, further comprising at least one of the followings:
determining whether all bits of the first data are 1 or not, when all bits of the first data are 1, writing the first data into the memory and, when not all bits of the first data are 1, writing encrypted data into the memory; and,
determining whether all bits of the second data are 1 or not, when all bits of the second data are 1, outputting the second data and, when not all bits of the second data are 1, outputting original data corresponding to the second data,
wherein all bits in an erased storage region of the memory are 1 after an erasing operation.

12. The protection method as claimed in claim 11, wherein performing encryption processing on the first data according to the first storage address information and the characteristic information of the memory comprises:
encrypting the first storage address information according to an address encryption key and a first encryption algorithm to obtain first encrypted address information;
executing a conversion operation on the first data and the encrypted address information to obtain a conversion result; and
performing encryption processing on the conversion result according to a data encryption and decryption key and a second encryption algorithm to obtain the encrypted data, the encrypted data being written into the memory.

13. The protection method as claimed in claim 12, wherein performing decryption processing on the second data according to the second storage address information and the characteristic information comprises:
performing decryption processing on the second data according to the data encryption and decryption key and the second encryption algorithm to obtain decrypted data; and
executing an inverse conversion operation on the decrypted data and second encrypted address information to obtain the original data corresponding to the second data,
the second storage address information being encrypted according to the address encryption key and the first encryption algorithm to obtain the second encrypted address information.

14. The protection method as claimed in claim 13, wherein
the first encryption algorithm comprises an Advanced Encryption Standard (AES) algorithm and a Data Encryption Standard (DES) algorithm;
the second encryption algorithm comprises the AES algorithm and the DES algorithm; and
the conversion operation comprises an exclusive OR operation.

15. The protection method as claimed in claim 13, further comprising:
generating the address encryption key and the data encryption and decryption key according to the characteristic information, wherein the characteristic information comprises a memory Identifier (ID) and at least one random sequence stored in the memory.

* * * * *